(12) United States Patent
Goossens et al.

(10) Patent No.: US 6,753,367 B2
(45) Date of Patent: Jun. 22, 2004

(54) FLAME RETARDANT POLYCARBONATE COMPOSITIONS WITH IMPROVED WEATHERING PERFORMANCE CONTAINING CYANOACRYLIC ESTERS

(75) Inventors: Johannes Martinus Dina Goossens, Bergen op Zoom (NL); Hendrik Verhoogt, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 09/932,914

(22) Filed: Aug. 20, 2001

(65) Prior Publication Data

US 2003/0069338 A1 Apr. 10, 2003

(51) Int. Cl.$^7$ .................. C08K 5/42; C08K 5/5419
(52) U.S. Cl. .................. 524/161; 524/162; 524/261; 524/262; 524/263; 524/267; 524/269; 524/316
(58) Field of Search ................. 524/161–162, 524/261–263, 267, 269, 316

(56) References Cited

U.S. PATENT DOCUMENTS

| | | | |
|---|---|---|---|
| 3,215,725 A | 11/1965 | Strobel et al. | 558/342 |
| 3,635,895 A | 1/1972 | Kramer | 525/422 |
| 3,816,367 A | 6/1974 | Larkin et al. | 524/410 |
| 3,948,851 A * | 4/1976 | Mark | 524/82 |
| 3,971,756 A | 7/1976 | Bialous et al. | |
| 4,001,184 A | 1/1977 | Scott | 528/182 |
| 4,080,404 A | 3/1978 | Deets | 524/371 |
| 4,092,291 A * | 5/1978 | Mark | 524/163 |
| 4,130,530 A | 12/1978 | Mark et al. | |
| 4,208,489 A | 6/1980 | Schmidt et al. | 525/146 |
| 4,217,438 A | 8/1980 | Brunelle et al. | 528/202 |
| 4,242,381 A | 12/1980 | Goossens et al. | |
| 4,335,032 A * | 6/1982 | Rosenquist | 524/269 |
| 4,387,176 A | 6/1983 | Frye | 524/268 |
| 4,464,497 A | 8/1984 | Belfoure | 524/416 |
| 4,632,949 A * | 12/1986 | Krishnan | 524/94 |
| 4,732,949 A | 3/1988 | Paul et al. | 525/464 |
| 4,735,978 A | 4/1988 | Ishihara | 524/162 |
| 4,774,273 A | 9/1988 | Kress et al. | 524/168 |
| 4,916,194 A | 4/1990 | Policastro et al. | |
| 4,994,510 A | 2/1991 | Naar et al. | 525/162 |
| 5,026,791 A | 6/1991 | Hawkins et al. | 524/464 |
| 5,068,302 A | 11/1991 | Horlacher et al. | 528/21 |
| 5,084,527 A | 1/1992 | Yamamoto et al. | |
| 5,153,251 A | 10/1992 | Lupinski et al. | 524/265 |
| 5,158,999 A | 10/1992 | Swales et al. | 524/100 |
| 5,187,243 A | 2/1993 | Jordan et al. | 525/464 |
| 5,218,027 A | 6/1993 | Smith et al. | 524/265 |
| 5,274,017 A | 12/1993 | Pan | 524/162 |
| 5,364,899 A | 11/1994 | Watanabe et al. | 524/265 |
| 5,385,970 A | 1/1995 | Gallucci et al. | 524/535 |
| 5,443,820 A | 8/1995 | Holderbaum et al. | 424/53 |
| 5,449,710 A | 9/1995 | Umeda et al. | 524/165 |
| 5,470,938 A * | 11/1995 | Sakashita et al. | 528/198 |
| 5,508,323 A | 4/1996 | Romenesko et al. | |
| 5,663,280 A * | 9/1997 | Ogoe et al. | 528/196 |
| 5,693,697 A * | 12/1997 | Weider et al. | 524/262 |
| 5,821,380 A | 10/1998 | Holderbaum et al. | 553/443 |
| 5,916,980 A | 6/1999 | Ogawa et al. | 525/465 |
| 5,955,542 A | 9/1999 | Davis et al. | 525/101 |
| 6,031,036 A | 2/2000 | Rosenquist et al. | 524/164 |
| 6,353,046 B1 * | 3/2002 | Rosenquist et al. | 524/267 |
| 6,423,768 B1 * | 7/2002 | Khouri | 524/445 |
| 6,441,071 B1 * | 8/2002 | Van Nuffel | 524/316 |
| 6,441,171 B1 * | 8/2002 | Mais et al. | 544/334 |
| 6,454,969 B1 * | 9/2002 | Nishihara | 252/609 |

FOREIGN PATENT DOCUMENTS

| | | |
|---|---|---|
| EP | 0122110 | 10/1984 |
| EP | 0522753 A2 | 1/1993 |
| EP | 0524730 A1 | 1/1993 |
| EP | 0 625 547 A1 | 11/1994 |
| EP | 06306265 | 11/1994 |
| EP | 0 675 159 A | 10/1995 |
| EP | 0855 421 A | 7/1998 |
| EP | 0 918 073 A2 | 5/1999 |
| EP | 0 918 073 A3 | 4/2000 |
| EP | 2000327897 | 11/2000 |
| JP | XP 002174566 | 7/1990 |
| JP | XP 002174567 | 7/1990 |
| JP | 03 168227 A | 7/1991 |
| JP | 9157512 | 6/1997 |
| WO | WO 01 16224 A | 3/2001 |

OTHER PUBLICATIONS

Steven Walter, "Filled polypropylene can be flexible and flame retardent, too", Plastics Engineering, USA, vol. 37, No. 6, pp. 24–27 (Jun. 1981).

* cited by examiner

*Primary Examiner*—Peter Szekely
(74) *Attorney, Agent, or Firm*—Oppedahl & Larson LLP

(57) ABSTRACT

The present invention relates to flame retardant polycarbonate compositions with improved weathering performance, said compositions comprising one or more cyanoacrylic esters. The invention also relates to methods for improving the flame retardancy and weathering performances of polycarbonate compositions by incorporating cyanoacrylic ester (s). Finally, the invention further relates to articles manufactured from flame retardant polycarbonate compositions comprising cyanoacrylic ester(s).

20 Claims, No Drawings

FLAME RETARDANT POLYCARBONATE COMPOSITIONS WITH IMPROVED WEATHERING PERFORMANCE CONTAINING CYANOACRYLIC ESTERS

FIELD OF THE INVENTION

The present invention relates to flame retardant polycarbonate compositions with improved weathering performance, said compositions comprising one or more cyanoacrylic esters. The invention also relates to methods for improving the flame retardancy and weathering performances of polycarbonate compositions. Finally, the invention further relates to articles manufactured from flame retardant polycarbonate compositions comprising cyanoacrylic ester(s).

BACKGROUND OF THE INVENTION

Fire proof, fire resistant and/or flame retardant materials are increasingly desired in applications where exposure of various plastics to heat or flame is possible or likely. For most polymer compositions, it is necessary to add materials to the composition that impart flame retardance to the final article. Flame retardant materials, and additives for imparting this property, are especially useful in applications such as housings and insulations for electrical and electronic devices. Examples of materials which have been used to impart such flame retardance are brominated resins, antimony oxide fillers, and organic phosphates. Flame retardancy has been predominantly provided by halogenated flame retardant additives, especially bromine- and chlorine-based flame retardant additives which are incorporated into various plastic compositions.

As pointed out by various environmental groups, a well-known and potentially serious drawback with regard to the use of such halogenated flame-retardant additives is the potential release of harmful or toxic gas when the composition is heated to elevated temperatures. Therefore, flame retardant systems, which are environmentally friendly, are preferred over halogen based systems.

Cyanoacrylic esters are known as additives for use in plastics for imparting various properties. For example, some cyanoacrylic esters are suitable as light stabilizers. U.S. Pat. Nos. 5,821,380 and 3,215,725; and DE-A 41 22 475 teach 2-cyanoacrylic esters of novel formulae for use in plastics and/or paints for the purpose of stabilizing said paint or plastic against the action of light, oxygen and heat. The cyanoacrylic esters and compositions of U.S. Pat. Nos. 5,821,380 and 3,215,725 and DE-A 41 22 475 are suitable for use in the polycarbonate compositions of the present invention. The cyanoacrylic esters and compositions of U.S. Pat. Nos. 5,821,380 and 3,215,725 are incorporated herein by reference.

Certain polysiloxanes are known to impart fire resistance to many plastics, including polycarbonate materials. These polysiloxanes are normally used in combination with a sulphonate salt.

Underwriters Laboratories has developed a variety of flammability and flame retardance tests for materials which are to be used with or near electricity. The UL rating is very influential and a polymer composition which does not have a UL flame rating will not be purchased for applications which require flame retardance. The UL flame test is designated UL-94 and a composition so tested can receive a rating of V-0 (most flame retardant), V-1, or V-2 (least flame retardant), depending on the results of the test.

What is desirable is a non-chlorine and non-bromine flame-retardant polycarbonate composition with improved weathering.

BRIEF SUMMARY OF THE INVENTION

The inventors surprisingly found that the use of cyanoacrylic ester UV-absorbers in ecological friendly polycarbonate materials significantly improves the flame characteristics. Superior flame retardant properties are obtained versus comparable polycarbonate formulations without a UV-absorber and with a benzotriazole based UV-absorber. This specification describes a non-chlorine and non-bromine flame-retardant polycarbonate composition with improved weathering.

The above discussed and other drawbacks and deficiencies of the prior art are overcome or alleviated by a flame retardant polycarbonate composition of the present invention comprising, inter alia, one or more cyanoacrylic ester (s).

In particular, the present invention provides polycarbonate compositions exhibiting flame retardancy, improved weathering performance, visual clarity, and reduced toxicity on exposure to elevated temperatures, relative to the emissions from the heating of conventional flame retardant polycarbonate compositions.

More particularly, the present invention provides polycarbonate compositions with flame retardancy meeting the UL-94-V0 rating without the use of chlorine-containing or bromine-containing additives, said compositions comprising, one or more commercially available sulphonate salts, one or more commercially available siloxanes, and one or more commercially available cyanoacrylic esters, such as but not limited to, Uvinul 3035, Uvinul 3030, or Uvinul 3039 available from BASF.

DETAILED DESCRIPTION OF THE INVENTION

The flame retardant polycarbonate compositions of the present invention containing one or more cyanoacrylic esters are visually clear, free of chlorine and bromine, and further incorporate one or more synergistic flame retardants. Useful synergistic flame retardants are salt based flame retardants, such as alkali metal or alkaline earth metal salts of inorganic protonic acids as well as organic BrÖnsted acids comprising at least one carbon atom. These salts should not contain chlorine and/or bromine. Preferably the salt based flame retardants are sulphonates and even more preferably they are selected from the group consisting of potassium diphenylsulfon-3-sulphonate (KSS), potassium-perfluorobutane-sulphonate (Rimar salt) and combinations comprising at least one of the foregoing. Other synergistic flame retardants are phenylpolysiloxanes, such as poly (phenylmethyl siloxane) and octaphenyltetracyclosiloxane.

In one embodiment of the present invention, there is provided a transparent, fire resistant, low combustion toxicity, polycarbonate composition comprising (a) polycarbonate and (b) a cyanoacrylic ester. In another embodiment, the polycarbonate composition further comprises (c) a sulphonate salt and/or (d) a siloxane.

By "low combustion toxicity" herein is meant the absence of bromine- and/or chlorine-based additives that can contribute to the toxicity of fumes emitted upon combustion.

In a preferred embodiment, the present invention provides a transparent polycarbonate composition comprising (a) a bromine-free and chlorine-free polycarbonate, (b) a cyanoacrylic ester, (c) a potassium sulphonate salt, and (d) a phenyl-siloxane having a molecular weight of about 120 to 150,000, but most preferably a low molecular weight of 120 to 1,500. The phenyl-siloxanes useful in the present invention can include, but are not limited to, poly (methylphenylsiloxane) such as "PD5" and "SR476" available from GE Bayer Silicones or comparable materials from Dow Corning Corporation.

The sulphonate salts useful in the present invention can include, but are not limited to, alkali and earth alkali metal sulphonate salts, such as potassium-perfluorobutane-sulphonate, available from 3M and Bayer, and potassium-diphenylsulfon-3-sulphonate, available from Seal Sands.

The cyanoacrylic esters useful in the present invention can include, but are not limited to, Uvinul 3030, Uvinul 3035 and Uvinul 3039, available from BASF.

The present invention is directed to a method to improve the flame retardance and weathering performance of polycarbonate compositions. Thus, in one embodiment the present invention provides a composition comprising (a) polycarbonate present at 89 to 99.9 weight percent; (b) at least one cyanoacrylic ester present at 0.01 to 0.5 weight percent; (c) at least one sulphonate salt present at 0.01 to 0.5 weight percent; and (d) at least one siloxane present at 0.01 to 1.0 weight percent.

Heat stabilizers can be used in the compositions of the present invention, including for example, tris(2,4-di-tert-butylphenyl)phosphite, such as Irgaphos 168 from Ciba.

Also useful herein are release agents such as, but not limited to, pentaerythritol tetrastearate (PETS), known as Loxiol, from Henkel.

In an important feature of the present composition, the polycarbonate is essentially free of halogens. Essentially free of halogen is herein defined as amounts insufficient to produce toxic fumes when burned. In general, therefore, the polycarbonate will comprise less than about 1.0, preferably less than about 0.5, and most preferably less than about 0.2 percent by weight of a halogen.

As used herein, the terms "polycarbonate" and "polycarbonate composition" includes compositions having structural units of the formula (I):

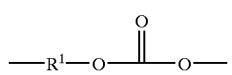

(I)

in which at least about 60 percent of the total number of $R^1$ groups are aromatic radicals and the balance thereof are aliphatic, alicyclic, or aromatic radicals. Illustrative non-limiting examples of radicals of this type are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantyl-idene.

Polycarbonates may be prepared by reacting a dihydroxy compound with a carbonate precursor such as phosgene, a haloformate, a carbonate or a carbonate ester, generally in the presence of an acid acceptor and a molecular weight regulator. Useful polymerization methods include interfacial polymerization, melt polymerization, and redistribution.

Some illustrative, non-limiting examples of suitable dihydroxy compounds include the dihydroxy-substituted aromatic hydrocarbons disclosed by name or formula (generic or specific) in U.S. Pat. No. 4,217,438, which is incorporated herein by reference. A nonexclusive list of specific examples of the types of precursor compounds that may be useful in preparing the present invention includes the following:

1,1-bis(4-hydroxyphenyl) methane;
1,1-bis(4-hydroxyphenyl) ethane;
2,2-bis(4-hydroxyphenyl) propane (hereinafter "bisphenol A" or "BPA");
2,2-bis(4-hydroxyphenyl) butane;
2,2-bis(4-hydroxyphenyl) octane;
1,1-bis(4-hydroxyphenyl) propane;
1,1-bis(4-hydroxyphenyl) n-butane;
bis(4-hydroxyphenyl) phenylmethane;
2,2-bis(4-hydroxy-1-methylphenyl) propane;
1,1-bis(4-hydroxy-t-butylphenyl) propane;
bis(hydroxyaryl) alkanes such as 2,2-bis(4-hydroxy-phenyl) propane;
1,1-bis(4-hydroxyphenyl) cyclopentane; and
bis(hydroxyaryl) cycloalkanes such as 1,1-bis(4-hydroxyphenyl) cyclohexane.

It is also possible in the production of the polycarbonates to employ two or more different dihydroxy compounds or copolymers of a dihydroxy compound with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents are well known and may comprise polyfunctional organic compounds containing at least three functional groups which may be hydroxyl, carboxyl, carboxylic anhydride, and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl) isopropyl)benzene), tris-phenol PA (4,4,1,1-bis(p-hydroxyphenyl)-ethyl) alpha,alpha-dimethyl(benzyl) phenol, trimesic acid and benzophenone tetracarboxylic acid. The branching agents may be added at a level of about 0.05–2.0 weight percent. Branching agents and procedures for making branched polycarbonates are described in U.S. Pat. Nos. 3,635,895 and 4,001,184 which are incorporated by reference. All types of polycarbonate end groups are contemplated as being within the scope of the present invention.

Preferred polycarbonates are based on bisphenol A, in which the average molecular weight of the polycarbonate is in the range of about 5,000 to about 100,000, more preferably in the range of about 10,000 to about 65,000, and most preferably in the range of about 15,000 to about 35,000. Furthermore the polycarbonate preferably has a melt viscosity index (MVI) of about 4 to about 30 cm3/10 min. For purposes of this application reported molecular weights are weight average molecular weights measured by gel permeation chromatography.

According to the present invention, cyanoacrylic esters can be added to, mixed with, reacted with, incorporated into, or in any other way contacted with the polycarbonate formulation to produce an improved, visually clear, flame retardant polycarbonate composition which exhibits low combustion toxicity. Especially useful cyanoacrylic esters for the present invention can include but are not limited to 1,3-bis-[2'-cyano-3',3-diphenylacryloyl)oxy]-2,2-bis-([2- cyano-3',3'-diphenylacryloyl)oxy]methyl)propane, also known as Uvinul 3030 from BASF; ethyl-2-cyano-3,3-diphenyl acrylate, known as Uvinul 3035 available from BASF; and 2-ethylhexyl-2-cyano-3,3-diphenylacrylate, known as Uvinul 3039 available from BASF.

Other cyanoacrylic esters useful in the polycarbonate compositions of the present invention include those of the general formula:

$(R^1(R^2)C=C(CN)CO-O)_n-X$ where

R$^1$ and R$^2$ are each hydrogen or a radical having an iso- or heterocyclic ring system with at least one iso- or heteroaromatic nucleus, and at least one of the radicals R$^1$ or R$^2$ must be different from hydrogen, n is from 1 to 10, and X is aliphatic.

Preferred 2-cyanoacrylic esters are those where up to three, particularly preferably one, of the radicals are hydrogen, $C_1-C_4$-alkyl, cyano, hydroxyl, acetyl, $C_1-C_5$-alkoxy, $C_1-C_8$-alkoxycarbonyl or cyclohexoxycarbonyl, and the remainder of these radicals are hydrogen.

Particularly preferred 2-cyanoacrylic esters are those where at least one radical is hydroxyl, methoxy, ethoxy, propoxy, isopropoxy, butoxy, isobutoxy, sec-butoxy or tert-butoxy, because such 4-substituted phenyl groups contribute to the stabilizing effect of the compounds.

The polycarbonate composition of the present invention may include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; and blowing agents. Examples of fillers or reinforcing agents include glass fibers, glass beads, carbon fibers, silica, talc and calcium carbonate. Examples of heat stabilizers include triphenyl phosphite, tris-(2,6-dimethylphenyl)phosphite, tris-(2,4-di-t-butyl-phenyl) phosphite, tris-(mixed mono-and di-nonylphenyl)phosphite, dimethylbenzene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agent include glycerol monostearate, sodium stearyl sulfonate, and sodium dodecylbenzenesulfonate. Examples of mold releasing agents include pentaerythritoltetrastearate, stearyl stearate, beeswax, montan wax and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

The transparent, fire resistant, cyanoacrylic ester-modified polycarbonate compositions of the present invention may be made by intimately mixing or otherwise contacting the polycarbonate resin or polycarbonate resin precursor and one or more cyanoacrylic ester and any other additives such as poly(methylphenylsiloxane) or octaphenyltetracyclosiloxane, and/or phosphonate salt based flame retardant either in solution or in melt, using any known mixing or blending method. Typically, there are two distinct mixing steps: a premixing step and a melt mixing step. In the premixing step, the ingredients are mixed together. This premixing step is typically performed using a tumbler mixer or a ribbon blender. However, if desired, the premix may be manufactured using a high shear mixer such as a Henschel mixer or similar high intensity device. The premixing step must be followed by a melt mixing step where the premix is melted and mixed again as a melt. Alternatively, it is possible to eliminate the premixing step, and simply add the raw materials directly into the feed section of a melt mixing device (such as an extruder) via separate feed systems. In the melt mixing step, the ingredients are typically melt kneaded in a single screw or twin screw extruder, and extruded as pellets.

In several examples of the present invention, a cyanoacrylic ester-modified polycarbonate composition with a UL94-V0 flame retardance performance rating at a thickness of 2.6 mm is achieved.

EXAMPLES

Flame Retardance and Visual Clarity

1. An experiment was performed to determine the effect of cyanoacrylic ester on the flame retardancy of linear, low viscosity, polycarbonate based on formulations containing polymethyl-phenyl-siloxane, PD5, and a synergistic flame retardant sulphonate salt, KSS. In this Example, Control 1 and Control 2 represent conventional polycarbonate compositions without cyanoacrylic ester, and Inventive 1 and Inventive 2 represent compositions of the present invention with cyanoacrylic ester incorporated into the polycarbonate composition.

| | Weight Percent | | | |
|---|---|---|---|---|
| Composition | Control 1 | Control 2 | Inventive 1 | Inventive 2 |
| Polycarbonate | 98.6 | 98.45 | 98.45 | 98.45 |
| PD5 | 0.7 | 0.7 | 0.7 | 0.7 |
| KSS | 0.25 | 0.25 | 0.25 | 0.25 |
| Cyasorb 5411 | | 0.15 | | |
| Uvinul 3039 | | | | 0.15 |
| Uvinul 3035 | | | 0.15 | |
| PETS | 0.35 | 0.35 | 0.35 | 0.35 |
| Irgaphos 168 | 0.1 | 0.1 | 0.1 | 0.1 |
| Melt Viscosity Index (ISO 1133) 300° C. | | | | |
| 1.2 kg (cc/10 min) Flammability tests of four samples each (For 1 sample, 5 bars are tested - in total 20 bars are tested) | 18.8 | 19.4 | 18.9 | 18.8 |
| UL94 at 2.6 mm | 1 × V0 | 4 × V2 | 3 × V0 | 2 × V0 |
| | 3 × V2 | — | 1 × V2 | 2 × V2 |
| Burning Drips | | | | |
| # of burning drips | 6 | 8 | 1 | 4 |
| Visual clarity % Transmission as a measure of visual clarity (ASTM D1003) | | | | |
| 3.2 mm | 89.4 | 89.8 | 88.9 | 89.7 |
| 2.5 mm | 89.9 | 89.9 | 89.5 | 90.0 |

-continued

| Composition | Weight Percent | | | |
|---|---|---|---|---|
| | Control 1 | Control 2 | Inventive 1 | Inventive 2 |
| Haze as a measure of visual clarity (ASTM D1003) | | | | |
| 3.2 mm | 2.6 | 2.1 | 2.7 | 2.3 |
| 2.5 mm | 2.1 | 2.0 | 2.3 | 2.1 |

This example demonstrates that the polycarbonate compositions of the invention as illustrated in Inventive 1 and Inventive 2, surprisingly exhibit improved UL94 performance. Three out of four samples of Inventive 1 gave the best performance rating of V0, and 2 out of 4 samples of Inventive 2 gave the best V0 performance rating. By comparison, Control 1 and Control 2 produced UL94 performance ratings of V2 for 3 out of 4 samples, and V2 for 4 out of 4 samples, respectively. In each case, the UL94-V2 rating is caused by one or more burning drips per sample. Inventive 1 and Inventive 2 using cyanoacrylic esters surprisingly exhibited only 1 and 4, respectively, burning drips compared to much less desirable 6 and 8 burning drips for Control 1 and 2, respectively. Finally, this Example illustrates the visual clarity and transparency of the polycarbonate compositions of the present invention according to the procedure of ASTM D1003.

Flame Retardance and Visual Clarity

2. An experiment was performed to determine the effect of cyanoacrylic ester on flame retardancy of linear polycarbonate based on formulations containing octaphenylcyclotetrasiloxane and a synergistic flame retardant sulphonate salt, Bayowet C4. In this Example, Control 3 and control 4 represent conventional polycarbonate compositions without cyanoacrylic ester, and Inventive 3 and Inventive 4 represent compositions of the present invention with cyanoacrylic ester incorporated into the polycarbonate composition.

| Composition | Weight Percent | | | |
|---|---|---|---|---|
| | Control 3 | Control 4 | Inventive 3 | Inventive 4 |
| Polycarbonate | 99.37 | 99.22 | 99.22 | 99.22 |
| Octaphenylcyclotetrasiloxane | 0.1 | 0.1 | 0.1 | 0.1 |
| Bayowet C4 | 0.08 | 0.08 | 0.08 | 0.08 |
| Cyasorb 5411 | — | 0.15 | — | — |
| Uvinul 3039 | — | — | — | 0.15 |
| Uvinul 3035 | — | — | 0.15 | — |
| PETS | 0.35 | 0.35 | 0.35 | 0.35 |
| Irgaphos 168 | 0.1 | 0.1 | 0.1 | 0.1 |
| Flammability tests of four samples each (For 1 sample, 5 bars are tested - in total 20 bars are tested) | | | | |
| UL94 at 3.2 mm | 3 × V0 1 × V2 | 3 × V0 1 × V2 | 4 × V0 — | 4 × V0 — |
| Burning Drips | | | | |
| # of burning drips | 1 | 1 | 0 | 0 |
| Melt Viscosity | | | | |

-continued

| Composition | Weight Percent | | | |
|---|---|---|---|---|
| | Control 3 | Control 4 | Inventive 3 | Inventive 4 |
| Index (ISO 1133) | | | | |
| 300° C., 1.2 kg (cc/10 min) | 17.8 | 18.2 | 18.2 | 18.3 |
| Visual clarity % Transmission as a measure of visual clarity (ASTM D1003) | | | | |
| 3.2 mm | 90.2 | 89.4 | 90.0 | 90.2 |
| 2.5 mm | 90.5 | 90.1 | 90.4 | 90.4 |
| Haze as a measure of visual clarity (ASTM D1003) | | | | |
| 3.2 mm | 1.8 | 2.6 | 2.0 | 2.1 |
| 2.5 mm | 1.6 | 2.1 | 1.7 | 1.8 |

This example demonstrates that the polycarbonate compositions of the invention as illustrated in Inventive 3 and Inventive 4, surprisingly exhibit improved UL94 performance. Four out of four samples of Inventive 3 and Inventive 4 gave the best V0 performance rating. By comparison, Control 3 and Control 4 produced UL94 performance ratings of V2 for one out of four samples. In each case the UL94-V2 rating is caused by a single burning drip. Finally, this Example illustrates the visual clarity and transparency of the polycarbonate compositions of the present invention according the procedure of ASTM D1003.

Examples

Flame Retardance, Artificial Weathering and Visual Clarity

2. An experiment was performed to determine the effect of cyanoacrylic ester on the flame retardancy of linear polycarbonate based on formulations containing polymethyl-phenyl-siloxane, PD5, and a synergistic flame retardant sulphonate salt, KSS. In this Example, Control 5 and Control 6 represent conventional polycarbonate compositions without cyanoacrylic ester, and Inventive 5 represents compositions of the present invention with cyanoacrylic ester incorporated into the polycarbonate composition.

| Composition | Weight Percent | | |
|---|---|---|---|
| | Control 5 | Control 6 | Inventive 5 |
| Polycarbonate | 98.6 | 98.45 | 98.45 |
| PD5 | 0.7 | 0.7 | 0.7 |
| KSS | 0.25 | 0.25 | 0.25 |
| Cyasorb 5411 | | 0.15 | |
| Uvinul 3035 | | | 0.15 |
| PETS | 0.35 | 0.35 | 0.35 |
| Irgaphos 168 | 0.1 | 0.1 | 0.1 |
| Flammability tests of four samples each (For 1 sample, 5 bars are tested - in total 20 bars are tested) | | | |
| UL94 at 3.2 mm | 4 × V0 | 4 × V0 | 4 × V0 |
| Average first flame out time (s) | 0.50 | 0.65 | 0.25 |
| Average second flame out time (s) | 4.00 | 4.70 | 2.85 |

-continued

| Composition | Weight Percent | | |
|---|---|---|---|
| | Control 5 | Control 6 | Inventive 5 |
| Melt Viscosity Index (ISO 1133) | | | |
| 300° C., 1.2 kg (cc/10 min) | 20.7 | 21.3 | 20.2 |
| Visual clarity | | | |
| % Transmission as a measure of visual clarity (ASTM D1003) | | | |
| 3.2 mm | 89.7 | 89.7 | 88.5 |
| 2.5 mm | 90.0 | 90.0 | 89.3 |

This example demonstrates that the polycarbonate compositions of the invention as illustrated in Inventive 5, surprisingly exhibit improved UL94 performance exhibited by low Average flame out times. For Inventive 5 the Average flame out times are lower than the Average flame out times for Control 5 and Control 6. For Inventive 5 the First Average flame out time of 0.25 seconds is significantly less than the First Average flame out time for Control 5 and Control 6, 0.50 seconds and 0.65 seconds, respectively. For Inventive 5, the Second Average flame out time of 2.85 seconds is significantly less than the Second Average flame out time for Control 5 and Control 6, 4.0 seconds and 4.7 seconds, respectively.

Weathering data

From the above Example (3), the samples labeled Control 5, Control 6 and Inventive 5 were formed into 2.5 mm plaques for testing of weathering performance. These samples were observed to provide comparable artificial weathering performance over a time exposure of 1500 hours in a Xenon 1200LM apparatus (according to ISO 4892 part 2, Method A). When compared to the weathering performance of material molded from Control 5 and Control 6 the effect of 0.15% UV-absorber is shown in the following table:

| Yellowness Index Numbers (ASTM 1925) | | | |
|---|---|---|---|
| Exposure time (hrs) | Control 5 | Control 6 | Inventive 5 |
| 0 | 2.3 | 2.5 | 3 |
| 51 | 6.2 | 3.1 | 3.3 |
| 96 | 8.6 | 3.8 | 3.9 |
| 124 | 12.1 | 5 | 5.3 |
| 331 | 16.8 | 7.2 | 8.2 |
| 427 | 18.7 | 8.4 | 9 |
| 664 | 22.7 | 9.6 | 10.8 |
| 826 | 26.7 | 10 | 10.9 |
| 958 | 29.3 | 11 | 12.2 |
| 1104 | 35.4 | 13 | 14.5 |
| 1475 | 46.2 | 16.6 | 18.4 |

Thus, a preferred composition of the present invention is as follows:

| | Weight % |
|---|---|
| Polycarbonate | 89–99.9 |
| Cyanoacrylic ester | 0.1–0.3 |
| Sulphonate salt | 0.05–0.3 |
| Phenyl-siloxane | 0.1–1.0 |

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A transparent, fire resistant, polycarbonate composition comprising: (a) a polycarbonate formulation, (b) a cyanoacrylate ester, and (c) a flame retardant selected from the group consisting of alkali metal salts of inorganic protonic acids, alkaline earth metal salts of inorganic protonic acids, alkali metal salts of organic Bronsted acids, and alkaline earth metal salts of organic Bronsted acids.

2. The polycarbonate composition of claim 1, wherein the flame retardant is a sulphonate salt.

3. The composition of claims 2, wherein the sulfonate salt is selected from the group consisting of potassium diphenylsulfon-3-sulphonate and potassium-perfluorobutanesulfonate.

4. The composition of claim 1, wherein the cyanoacrylic ester is selected from the group consisting of 1,3-bis-[2'-cyano-3',3-diphenylacryloyl)oxy]-2,2-bis-([2-cyano-3',3'-diphenylacryloyl)oxy methyl)propane; ethyl-2-cyano-3,3-diphenyl acrylate; and 2-ethylhexyl-2-cyano-3,3-diphenylacrylate.

5. The composition of claim 1, further comprising a phenyl-siloxane.

6. The composition of claim 5, wherein the flame retardant is a sulphonate salt.

7. The composition of claim 5, wherein the phenyl-siloxane is selected from the group consisting of poly (methylphenylsiloxane) and octaphenylcyclotetrasiloxane.

8. The composition of claim 5, wherein the poly (methylphenylsiloxane) has a viscosity of about 1 to about 300 centistokes.

9. The composition of claim 1, wherein the cyanoacrylic ester is 1,3-bis-[2'-cyano-3',3-diphenylacryloyl)oxy]-2,2-bis-([2-cyano-3',3'-diphenylacryloyl)oxy]methyl)propane.

10. The composition of claim 1, wherein the cyanoacrylic ester is ethyl-2-cyano-3,3-diphenyl acrylate.

11. The composition of claim 1, wherein the cyanoacrylic ester is 2-ethylhexyl-2-cyano-3,3-diphenylacrylate.

12. The composition of claim 1, wherein the composition is essentially free of chlorine.

13. The composition of claim 1, wherein the composition is essentially free of bromine.

14. The composition of claim 1, wherein the composition has a UL94 V0 rating for flame retardance at a thickness greater than or equal to 2.6 millimeters.

15. The composition of claim 1, wherein the composition has improved flame retardance relative to a polycarbonate composition without a cyanoacrylic ester.

16. The composition of claim 1, wherein the composition has improved weathering and flame retardance performance relative to a polycarbonate composition without a cyanoacrylic ester.

17. The composition of claim 1, wherein the polycarbonate formulation is present in an amount of from 70 weight percent to 99.9 weight percent, and where the cyanoacrylic ester is present in an amount of from 0.01 weight percent to 10 weight percent.

18. The composition of claim 1, wherein the polycarbonate formulation is present in an amount of from 70 weight percent to 99.9 weight percent, and wherein the cyanoacrylic ester is present in an amount of from 0.01 weight percent to 0.5 weight percent.

19. A method to improve the flame retardance of a polycarbonate composition comprising polycarbonate and a flame retardant selected from the group consisting of alkali metal salts of inorganic protonic acids, alkaline earth metal salts of inorganic protonic acids, alkali metal salts of organic Bronsted acids, and alkaline earth metal salts of organic Bronsted acids, said method comprising adding to the polycarbonate composition or to a polycarbonate formulation from which the polycarbonate composition is produced an amount of a cyanoacrylic ester effective for improving the flame retardance of said polycarbonate composition relative to the flame retardance of the polycarbonate composition without the cyanoacrylic ester.

20. A method to improve the weathering and flame retardance performance of a polycarbonate composition comprising polycarbonate and a flame retardant selected from the group consisting of alkali metal salts of inorganic protonic acids, alkaline earth metal salts of inorganic protonic acids, alkali metal salts of organic Bronsted acids, and alkaline earth metal salts of organic Bronsted acids, said method comprising adding to the polycarbonate composition or to a polycarbonate formulation from which the polycarbonate composition is produced an amount of a cyanoacrylic ester effective for improving the weathering and flame retardance performance of said polycarbonate composition relative to the weathering and flame retardance performance of the polycarbonate composition without the cyanoacrylic ester.

\* \* \* \* \*